United States Patent [19]
vom Stein

[11] Patent Number: 5,257,895
[45] Date of Patent: Nov. 2, 1993

[54] ARRANGEMENT FOR FEEDING A TWO-WAY PALLET ONTO A ROLLER PATH

[75] Inventor: Hans vom Stein, Wermelskirchen, Fed. Rep. of Germany

[73] Assignee: Interroll Holding AG, Switzerland

[21] Appl. No.: 675,323

[22] Filed: Mar. 26, 1991

[51] Int. Cl.⁵ .............................................. B65G 63/00
[52] U.S. Cl. .................................... 414/608; 414/927; 414/799; 414/754; 108/51.1; 193/35 R
[58] Field of Search ............... 414/607, 608, 799, 927, 414/928, 929, 754; 193/35 R, 44, 35 MD; 104/35, 49, 48; 108/51.1, 51.3

[56] References Cited

U.S. PATENT DOCUMENTS

| | | | |
|---|---|---|---|
| 2,451,226 | 10/1948 | Kemp, Jr. | 414/608 X |
| 2,990,069 | 6/1961 | Repasky et al. | 414/799 |
| 3,902,609 | 9/1975 | Ohlsson | 414/799 X |
| 4,180,361 | 12/1979 | Longinotti | 414/927 X |
| 4,298,305 | 11/1981 | Neth | 414/608 X |
| 4,565,129 | 1/1986 | Simeth et al. | 414/927 X |
| 5,039,270 | 8/1991 | Parks et al. | 414/799 X |

FOREIGN PATENT DOCUMENTS

1915134 9/1970 Fed. Rep. of Germany .... 108/51 R
2604 1/1986 Japan ........................... 193/35 R Primary Examiner—Frank E. Werner
Attorney, Agent, or Firm—Anthony J. Casella; Gerald E. Hespos

[57] ABSTRACT

An arrangement is provided for a roller conveyor for efficiently accommodating two-way pallets. The arrangement includes a interim parking station in proximity to the initial and/or final end region of the roller conveyor. The interim parking station includes a parking surface characterized by a pair of spaced apart recesses to receive the forks of a forklift device. Thus, a two-way pallet can be picked up at a remote location by a forklift device in the conventional manner with the forks of the forklift device passing into spaces between adjacent scantlings of the pallet. The forklift device can then deposit the two-way pallet onto the scantlings. The same forklift device or a separate forklift device can then approach the interim parking station with the forks of the forklift device aligned parallel to the recesses in the parking surface of the interim parking station. The forks can be inserted into these recesses and beneath the bottom surface of the pallet to enable the two-way pallet to be transferred.

6 Claims, 3 Drawing Sheets

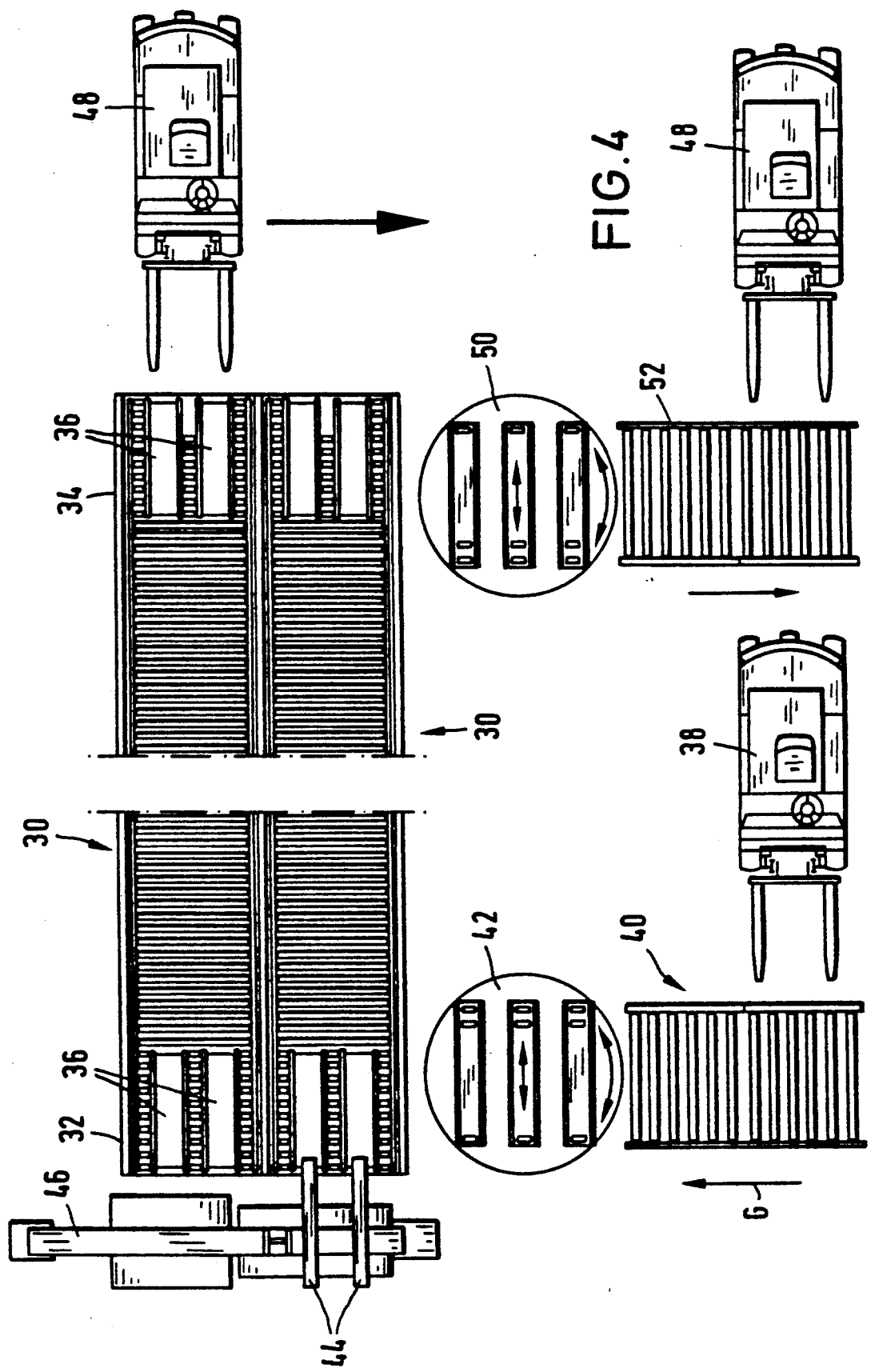

ARRANGEMENT FOR FEEDING A TWO-WAY PALLET ONTO A ROLLER PATH

BACKGROUND OF THE INVENTION

The present invention relates to a method and an arrangement for feeding a two-way pallet onto a roller path in which the two-way pallet is fed by means of forklift devices onto the roller path, transported by the roller path, and removed from the roller path by means of forklift devices.

The transportation of stackable goods is effected to a large extent on pallets. The pallets most frequently used are American or Australian standard pallets which are used primarily in the United States of America, Australia and the Far East. On the Continent, on the other hand, European pool pallets, so-called Euro pallets are used. Said pallets have a rectangular or square base surface. The essential difference between the U.S./Australian pallets and Euro pallets is that the Euro pallets, deposited on a continuous surface such as, for instance, the loading surface of a truck or the floor of a warehouse, can be gripped on all four sides by the forks of a forklift device and lifted for transportation. For this reason, the Euro pallet is also known as a four-way pallet. The U.S./Australian pallet, on the other hand, can be gripped and lifted for transportation by the forks of a forklift device only from two opposite directions, for which reason it is also known as a two-way pallet. This is based on the different construction of said pallets.

The U.S./Australian pallets, as well as the Euro pallet, consist of wood.

A Euro pallet, viewed from its standing surface up to the loading surface, is developed in the manner that the lowermost layer, serving as standing surface, consists of three elongated bottom boards arranged spaced apart and parallel to each other. Three blocks which are arranged on these bottom boards, spaced apart in the longitudinal direction of the boards. The first as well as the last block terminate flush with the beginning and end respectively of the individual bottom boards, while the remaining block is arranged in the center. The width of the boards and the width of the individual blocks are the same. On the top of the blocks, elongated intermediate boards are again arranged parallel to and spaced from each other, they extending over the corresponding blocks and their starting and stopping ends terminating flush with the outer blocks. The longitudinal axes of the intermediate boards extend perpendicular to the longitudinal axes in the same direction as the bottom boards. As a general rule, the Euro pallets are gripped by a forklift device in the manner that the forks of the forklift device extend in the direction of the longitudinal axes of the bottom and top boards. The forks of the forklift device then engage for the transporting away of the Euro pallet into the spaces left by the blocks and bottom boards. If necessary, the Euro pallet, due to the space between the individual blocks, can, to be sure, also be gripped and transported away from a standing surface from the adjacent sides, i.e. 90° away. The forks of the forklift device then engage into the spaces formed between the bottom boards, the blocks and the intermediate as well as top boards.

In the U.S./Australian pallet, elongated bottom boards, also arranged spaced from and parallel to each other, are present as standing surface. As compared with the Euro pallet, the space between the bottom boards is very much smaller, but it may also vary. Continuous scantlings are arranged on the bottom boards, extending perpendicular to the longitudinal axes. The scantlings extend parallel to each other and are spaced apart. As loading surface, elongated top boards extending parallel to and spaced from each other are placed on the top side of the continuous scantlings. The top boards have their longitudinal axes extending perpendicular to the longitudinal axes of the bottom boards. For removal by a forklift device, the forks are introduced into the space formed by the top boards, bottom boards and scantlings. The forks then necessarily point with their longitudinal axes in the direction of the longitudinal axes of the scantlings and thus perpendicular to the longitudinal axes of the bottom and top boards. Since the transporting away of the U.S./Australian pallet is thus possible only from two directions, the U.S./Australian pallet is also known as a two-way pallet.

Upon the transporting of two-way pallets on roller paths, for instance in a conveyor storage in which, as a general rule, several roller paths are arranged in a plane alongside of each other, the development of the two-way pallet is a definite disadvantage. Lateral charging of the pallets onto roller paths is generally not possible due to considerations of space as well as reasons of safety and due to the lateral limitation of the roller path. If a two-way pallet is placed onto the roller path in direction of conveyance, the longitudinal axes of the bottom boards necessarily extend perpendicular to the direction of travel of the roller path, i.e. in the direction of the longitudinal axis of the individual rollers of the roller path. The bottom boards of the two-way pallet accordingly have their longitudinal axes transverse to the direction of transport of the roller path. When using roller paths with continuous individual roller, i.e. rollers which extend over the entire width of the roller path, considerable difficulties result upon the transport due to the necessary alignment of the bottom boards parallel to said rollers. Even in the event that the bottom boards have still not warped or loosened in part or were from the start uneven or curved, the longitudinal axes of the bottom boards become caught in the spaces present between the individual rollers of the roller path and prevent or impede the further transport. Since, in the course of time, the bottom boards are subject to warping and loosening of the scantlings, the transport on the roller path is even more impeded. In this connection, it is not rare that individual two-way pallets can no longer be conveyed at all on the roller path or, even worse, remain stuck on the roller path during the course of the transport and block the further transport of the adjacent pallets.

This disadvantage, which has been known for a long time, has been overcome up to now by using for the transport of two-way pallets roller paths which, as seen over the width of the roller path, have individual rollers which are shorter than the roller path and are arranged with their gaps shifted, with respect to each other. In this way, there is prevented the formation, seen over the width of the roller path, of a continuous space between the rollers in which the bottom boards could become stuck. Such a construction of a roller path due to the plurality of rollers as compared with a roller path having rollers which are continuous over the entire width of the roller path, is however very much more expensive already in the expense for the individual rollers and the corresponding supporting elements than a roller path with continuous rollers. Furthermore, roller paths developed in this manner are considerably more expensive to install and maintain than roller paths with continuous individual rollers.

OBJECTS AND SUMMARY OF THE INVENTION

The object of the present invention is to provide a method and an arrangement for the feeding of a two way pallet onto roller paths, particularly when several roller paths are arranged alongside of each other, with which the transport of two way pallets on roller paths can be effected free of interference and trouble even if the roller path is constructed of individual rollers which are spaced from each other and each of which extends over the entire width of the roller path.

This object is achieved in accordance with the method of the invention in the manner that the two-way pallet is so fed onto the roller path that the bottom boards which serve as standing surface of the two-way pallet are so aligned that the longitudinal axes of the bottom boards extend in the direction of travel of the roller path, i.e. perpendicular to the longitudinal axes of the individual rollers of the roller path.

One particular advantage of the present invention resides in the fact that by this selective alignment of the bottom boards of the two-way pallet, undisturbed transport on the roller path is possible. In particular, one can employ for the transport of the two-way pallets a roller path in which the individual rollers extend over the entire width of the roller path. The continuous space produced as a result of the spacing of the individual rollers from each other no longer prevents the transport of the two-way pallet since the bottom boards are directed in the direction of travel and thus can no longer become jammed or caught in the space between the rollers. Even two-way pallets in which individual boards of the bottom boards have partially loosened or warped do not prevent the transport of the two-way pallet on the roller path since loosening or warping cause a change of the boards only with respect to their longitudinal axis.

In order to achieve the desired alignment of the two-way pallet to the roller paths for transport, the two-way pallet for feeding onto the roller path in the direction of travel of the roller path is first of all set down, then taken up by being gripped beneath and then fed again onto the roller path. The decisive factor in this connection is that the desired alignment of the two-way pallet can be obtained by gripping beneath the two-way pallet. The forklift device can grip the two-way pallet and raise it from a standing surface only in the manner that the forks of the forklift device engage into the space between the bottom and top boards and the forks therefore extend perpendicular to the individual top and bottom boards. In order to obtain the desired alignment upon the feeding onto the roller path in the direction of travel thereof, the two-way pallet must be gripped beneath in order to align the longitudinal axes of the bottom boards in the longitudinal direction of the forks of the forklift device.

In corresponding manner, in order to obtain the necessary alignment of the two-way pallet with respect to the forklift device for the further transport after passing over the roller path, the two-way pallet, in order to remove it from the roller path in the direction of travel with respect to the roller path, must first of all be gripped beneath, set down and then taken up again. This taking up again can then be effected in customary manner by the engagement of the forks of the forklift device in the direction of the longitudinal axis of the scantlings so that the two-way pallet can be deposited again, for instance on a vehicle.

In a special embodiment of the invention, the two-way pallet, before it is fed onto the roller path, is transported by a forklift device to a unit and set down there, the two-way pallet is then taken up again after relative displacement by 90° between the two-way pallet and the forklift device, in particular by shifting the forklift device or turning the two-way pallet, the forks of the forklift device engaging, upon the further transport, below the two-way pallet, and finally feeding the two-way pallet in direction of travel of the roller path onto the roller path.

It is also possible for the two-way pallet, after it has been set down, to be taken up again in the manner described by a second forklift device which has been shifted 90° with respect to the first forklift device, so that the first forklift device is used merely for the initial transport to the interim parking unit and the second forklift device is used merely to take it up from the interim parking unit and feed it to the roller path.

For this purpose, it is of course necessary that said means be so developed that gripping beneath the two-way pallet is possible. The surface of the unit on which the two-way pallet is set therefore must not be continuous but must have interruptions at the places where the forks are fed beneath the two-way pallet of said unit by gripping beneath it.

In corresponding manner, at the end of the roller path the two-way pallet is gripped beneath in the direction of travel of the roller path by a forklift device and lifted off from the roller path, then transported to another unit and set down there and, for the further transport, taken up again by the forklift device after a relative displacement of 90° between the two-way pallet and the forklift device or a turning of the two-way pallet, the forks of the forklift device engaging in the direction of the longitudinal axis of the scantlings into the corresponding spaces of the two-way pallet.

In this connection, as is clear and as is also true in the case of said unit, the starting and stopping ends of the roller path must be so developed that it is possible to grip beneath the two-way pallet. This is achieved by a known interruption of the roller path in transverse direction so that a free space is created in the region of the engagement of the forks of the forklift device.

In this case also, the further transport of the two-way pallet can be effected by a second forklift device which is shifted 90° relative to the first forklift device so that the first forklift device is used merely for the transport between the roller path and the interim parking unit and the second forklift device serves merely for the taking up again and further transport of the two-way pallet.

For the turning of the two-way pallet by 90° the unit may advantageously be turned by 90°.

In a further embodiment, the unit can be displaced linearly in order to remove the two-way pallet from a forklift device or to feed the two-way pallet to the same or a second forklift device.

In another preferred embodiment, the two-way pallet can be set down on the roller path and removed from it by a forklift device perpendicular to the direction of travel of the roller path. When roller paths are arranged alongside of each other, this however is possible only in the case of the first and last roller paths. In addition, in this case the roller path should be so developed that assurance is had that the two-way pallets will also be deposited centrally with respect to the roller path.

This object is achieved by the apparatus in accordance with the invention in the manner that the arrangement has an interim parking unit and that after the depositing of the two-way pallet on the interim parking unit, a relative displacement of 90° between the two-way pallet and the forklift device can be effected.

Another solution of the object with respect to the apparatus consists in providing two forklift devices for the arrangement, the two-way pallet being removable from the interim parking unit by being gripped beneath by a second forklift device which is shifted 90° relative to the first forklift device.

With the aid of the interim parking unit, it is possible to align the two-way pallet before the feeding onto or removal from a roller path in such a manner that the longitudinal axes of the bottom boards of the two-way pallet are aligned in the direction of travel of the roller path upon the feeding and removal. The advantages which have already been explained when describing the method of the invention thus result.

In order to make it possible for the forks of the forklift device to grip beneath the two-way pallet, the interim parking unit is advantageously developed in corresponding manner on its top or parking surface.

Such a development may preferably consist therein that downward extending shaft-like recesses which are open on top are arranged on the top of the interim parking unit, the forks of the forklift device being adapted to be introduced into said recesses.

In order to shorten the transport paths and assure disturbance-free operation in the region of the roller path or paths, the interim parking unit is preferably arranged in the region of the beginning or end of a roller path.

In order to be able to feed and remove two-way pallets which are gripped beneath by the forklift device, the roller path is preferably provided in the region of its start or end, over the width of the roller path, with at least two in particular elongated sections which remain free.

The interim parking unit may also be movable linearly and/or turnable. Thus the relative movement between the two-way pallet and the forklift device can take place not only by a corresponding displacement of the forklift device but also by the interim parking unit. The forklift device in such case need no longer be moved upon the depositing of the two-way pallet, since the interim parking unit first of all moves the two-way pallet away from the forks of the forklift device, then turns the two-way pallet, and finally feeds it again to the same or a second forklift device.

In front of the interim parking unit there can be arranged a feed means, in particular in the form of a driveable roller path. The two-way pallet can be deposited by a forklift device on the feed means which then feeds the two-way pallet to the interim parking unit.

In another variant, the interim parking unit itself can be developed as feed and/or removal means, in particular as driveable roller path, for the feeding and/or removal of the two-way pallet to and/or from the roller path. The interim parking unit can then effect the relative displacement between the two-way pallet and the forklift device, for instance in the form of a turntable, and furthermore deliver the two-way pallet directly to the roller path or remove it directly from it without the forklift device having to engage again.

One of the two forklift devices may also be a positively guided forklift device arranged in particular at one end surface of a vertical shelf storage.

BRIEF DESCRIPTION OF THE DRAWINGS

FIG. 4 is a top view of a part of another conveyor storage.

DETAILED DESCRIPTION OF THE PREFERRED EMBODIMENT

Figure 1:
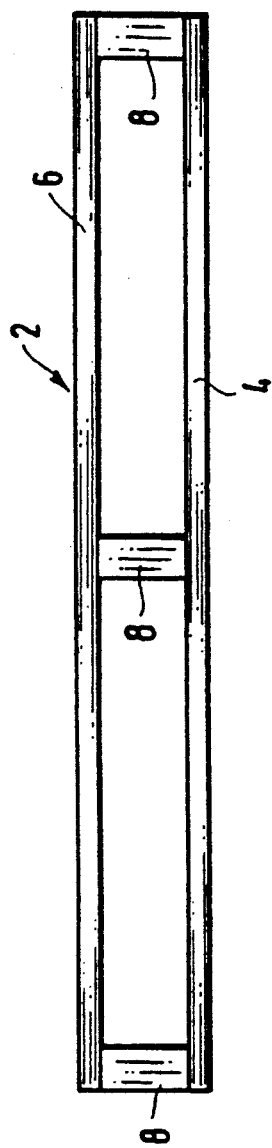
FIG. 1 is a side view of a two-way pallet.
Figure 2:
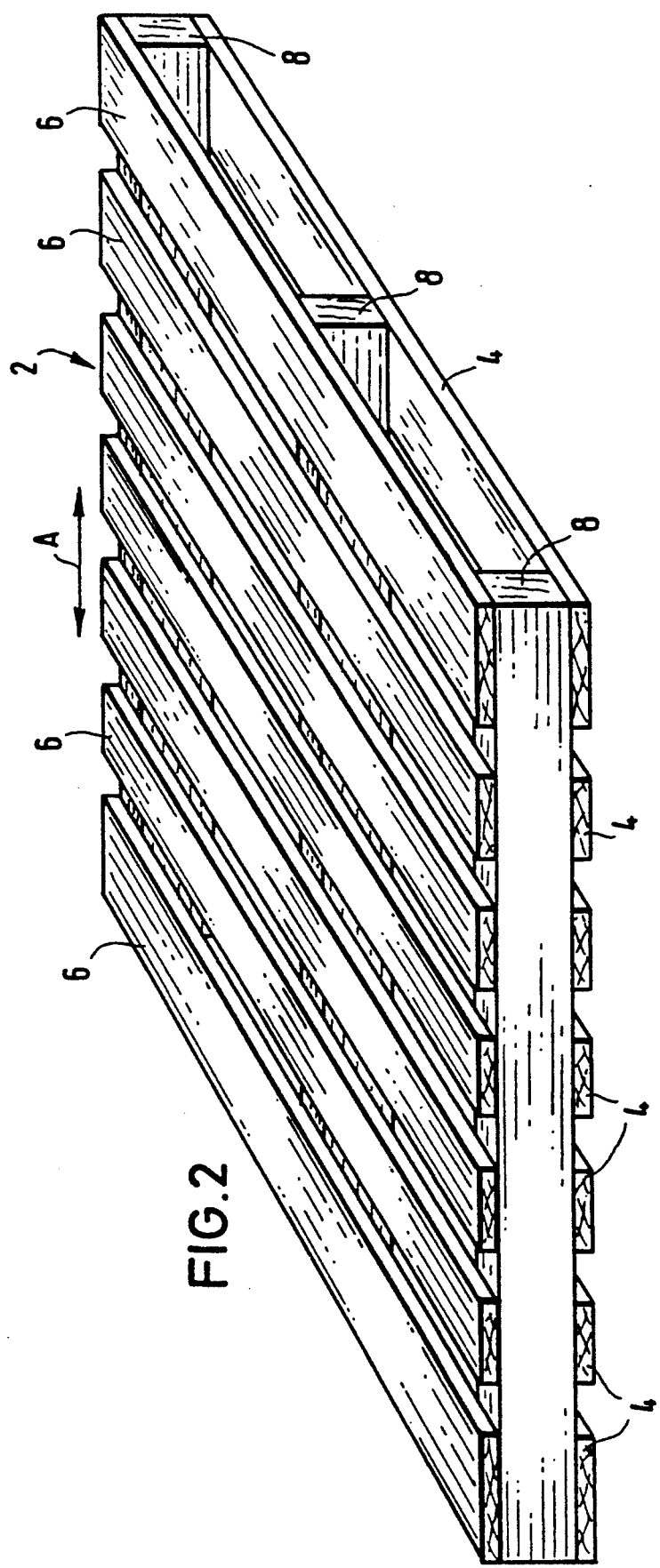
FIG. 2 is a perspective view of the two-way pallet of FIG. 1.

FIGS. 1 and 2 show a two-way pallet in side view and in perspective respectively. As resting surface of the two-way pallet 2, there are provided bottom boards 4 which are arranged parallel to and spaced from each other. The loading surface of the two-way pallet 2 is formed of top boards 6, which are also arranged parallel to and spaced from each other. Between the bottom and top boards 4, 6 there are three continuous scantlings 8 which are parallel to each other. The bottom and top boards 4, 6 have their longitudinal axes aligned parallel to each other, while the longitudinal axes of the scantlings 8 are arranged for the lateral delimitation of the two-way pallet 2 at its outer edges, while the third scantling 8 is arranged in the central region of the bottom boards 4, the top boards 6 and the scantlings 8 so as to be able to lift the two-way pallet 2 from a resting surface and transport it. The double-ended arrow A in FIG. 2 indicates the direction in which the forks of a forklift device can grip the two-way pallet 2. As a result of the continuous scantlings 8, it is not possible to grip the two-way pallet 2 from the directions perpendicular to the arrow A.

The basic construction of the two-way pallet 2 shown in FIGS. 1 and 2 corresponds essentially to the construction of an Australian or American standard pallet. Two-way pallets can differ by the number and/or distribution of the bottom boards 4. The essential common feature of two-way pallets however are the continuous scantlings 8 and accordingly the possibility of a forklift device gripping a two-way pallet 2 only from two opposite directions when the two-way pallet 2 rests on a continuous surface, such as for instance the loading surface of a truck or warehouse floor.

For the unimpeded transport of the two-way pallet 2 on a roller path, it is proposed in accordance with the invention to feed the two-way pallet 2 upon feeding or removal in direction of travel of the roller path, i.e. perpendicular to the longitudinal axes of the individual rolls of the roller path. For this, an arrangement is proposed which can be noted from the description of FIGS. 3 and 4.

Figure 3:
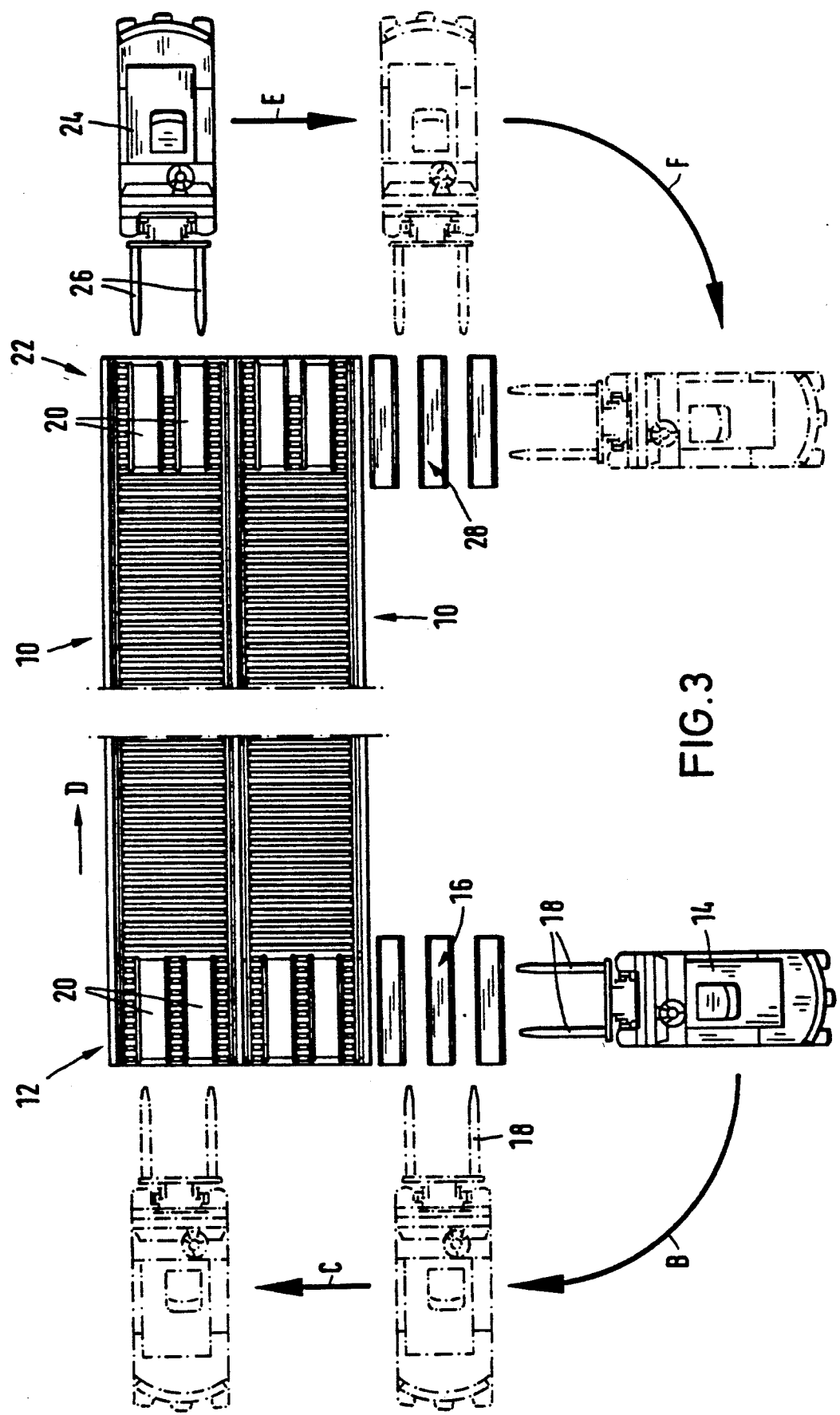
FIG. 3 is a top view of a part of a conveyor storage.

FIG. 3 shows, in top view, a part of a conveyor storage with two roller paths 10 arranged alongside of each other. The roller paths 10 have been shown in reduced length and furthermore, several roller paths 10 are arranged in a conveyor storage alongside of each other and possibly also one above the other. Before the two-way pallets (not shown) are fed to the starting end 12 of the roller path 10, they are fed by a forklift device in the form of a forklift truck 14 to an interim parking unit 16 which is arranged in the region of the starting end of the first roller path 10. The forklift truck 14 which has lifted a two-way pallet for instance off from a truck, deposits the two-way pallet on the interim parking unit 16. The two-way pallet is in this connection gripped in customary manner by the forks 18 of the forklift truck 14 i.e. by the introduction of the forks 18 between the bottom boards and the top boards thereof. In order to be able to feed the two-way pallet to the roller paths 10 in the manner specified in the invention, a relative movement of 90° must take place between the forklift truck 14 and the two-way pallet, or a second forklift device arranged 90° away from the first forklift truck 14 must be present. By the arrow B it is indicated that the forklift truck 14 is moved 90° before the two-way pallet is again lifted off from the interim parking unit 16. Since the two-way pallet can be picked up from this 90° shifted direction only by the forks 18 of the forklift truck 14 engaging below the two-way pallet, the interim parking unit 16 is developed in corresponding fashion. The development of the interim parking unit 16 in the form of three individual parts which are spaced from each other makes it possible for the forks 18 of the fork truck 16 to engage beneath the two-way pallet into the interim parking unit. The two-way pallet which is then gripped beneath is fed, as indicated by the arrow C, to the starting end of the roller path 10. By the recesses 20 present at the starting end 12 of the roller path 10, it is possible to deposit the two-way pallet which is supported from below onto the roller path 10.

The two-way pallet is conveyed, indicated by the arrow D, in the desired alignment, namely with the longitudinal axes of the bottom boards in the direction of travel 9 of the roller path 10 on the latter. At the end 22 of the roller path 10 the two-way pallet is lifted off from the roller path 10 by another forklift device in the form of another forklift truck 24. The lifting off of the two-way pallet can be effected, due to its alignment, only by the forks 26 of the forklift truck 24 is brought, as indicated by the arrow E, to another interim parking unit 28 which can be developed in the same manner as the interim parking unit 16 arranged at the starting end 12 of the roller path 10. The further interim parking unit 28 is arranged at the end 22 in the region of a roller path 10. The development of the interim parking unit 28 already described for the interim parking unit 16 makes it possible for the forklift truck 24 to deposit the two-way pallet and then, as indicated by the arrow F, again to engage below the two-way pallet and then, as indicated by the arrow F, again to engage below the two-way pallet from a direction which is shifted 90°. In this connection, the two-way pallet is gripped in the customary manner, the forks 26 of the forklift truck 28 engaging between the bottom and top boards of the two-way pallet. In this way, the two-way pallet can finally be placed on a continuous surface.

FIG. 4 shows another construction of a conveyor storage, again with merely two roller paths 30 shown with shortened length. The construction of the roller paths 30 in accordance with FIG. 4 corresponds to the roller paths 10 in accordance with FIG. 3. In particular, recesses 36 are also provided at the start 32 of the roller paths 30 as well as at their end 34. A forklift truck 38 first of all places the two-way pallet (not shown), which is gripped beneath in customary manner, on a feed device 40 in the form of a driveable roller path. The lateral feeding of the two-way pallet by the forklift truck 38 onto the feed device 40 can be supported by suitable additional means, such as for instance mechanical stop elements or light barriers and is fundamentally possible for the reason that the feed means 40 is developed as an individual roller path. The feed means 40 has driveable individual rollers which feed the two-way pallet in the direction of the arrow G to an interim parking unit 42. The interim parking unit 42 is turnable and can be displaced linearly; it is developed essentially in the same manner as the interim parking unit 16 and 28 of FIG. 3 and, in particular, has a development on its top side which permits the forks 44 of a forklift device 46 to engage beneath the two-way pallet present on the interim parking unit 42. In the position shown, the interim parking unit 42 has already turned after the feeding of a two-way pallet so that the forks 44 of the linearly displaceable forklift device 46 can engage below the two-way pallet. The linear movement of the forklift device 46 extends perpendicular to the roller paths 30 which may also be the end surface of a vertical shelf storage. The receiving of a two-way pallet present on the interim parking unit 42 by the forklift device 46 is assisted by the linear displacement of the interim parking unit 42. After the interim parking unit 42 has been turned 90° and the forks 44 of the forklift device 46 are at a height corresponding to the interim parking unit 42, the interim parking unit 42 is moved linearly in the direction towards the forklift device 46 so that the forklift device 46 can lift the two-way pallet off and feed it to the starting end 32 of the roller path 30.

In addition, the forks 44 of the forklift device 46 can be moved in the direction towards the interim parking unit 42 in order to assist in the removal of the two-way pallet. The forklift device 46 is positively guided and can, in addition to the linear travel, also move upward or downward in order to be able to serve a vertical shelf storage.

The feeding and the removal of the two-way pallets on the roller path 30 are effected in the manner explained with reference to FIG. 3. At the end 34 of the roller path 30 the two-way pallet can then, as also described in FIG. 3, be removed by a further forklift truck 48. Instead of the further forklift truck 48, there can also be provided one of the forklift devices 46 or another forklift truck. In corresponding manner, the two-way pallet is then fed to another interim parking unit 50, turned 90° by turning the interim parking unit 50 and fed to a removal unit 52 in order finally to be gripped in customary manner by the forklift truck 48 and transported.

I claim:

1. An arrangement using a forklift device to transfer a two-way pallet relative to an elongate roller path, said forklift device having a pair of spaced apart forks for selectively lifting the pallet, the pallet having a top, a plurality of parallel spaced apart continuous scantlings connected to the top and a bottom connected to the scantlings, such that a plurality of fork-receiving spaces are defined between the top, the bottom and the respective scantlings; said elongate roller path having opposed initial and final regions for respectively feeding and removing the pallet from the elongate roller path,, said arrangement being characterized by:

at least one of the initial and final regions of the roller path being provided with a pair of recesses extending parallel to the elongate roller path, said recesses being dimensioned and disposed for receiving the forks of the forklift device therein;

at least one interim parking station disposed in proximity to the fork-receiving recesses of the roller path, the interim parking station having a parking surface dimensioned for supporting the pallet thereon, the parking surface having a pair of spaced apart elongate recesses disposed and dimensioned for receiving the forks of the fork lift device; whereby the pallet can be deposited on and removed from the interim parking station with the scantlings of the pallet aligned transverse to the recesses in the parking surface, and whereby the pallet can be transferred between the interim parking station and the roller path by selectively inserting the forks of the forklift device below the bottom of the pallet and into the recesses of at least one of said interim parking station and said roller path and subsequently lifting the forks and the pallet thereon.

2. An arrangement according to claim 1 comprising fork- receiving recesses at both the initial and final regions of the roller path and further comprising a pair of interim parking stations disposed respectively in proximity to the initial and final regions of the roller path.

3. An arrangement according to claim 1, wherein the interim parking station is rotatable about an axis orthogonal to the parking surface thereof and is moveable linearly in directions transverse to the elongate roller path.

4. An arrangement according to claim 3 further comprising a driveable feed roller path adjacent the interim parking station for selectively feeding pallets relative to the parking surface of the interim parking station.

5. An arrangement using firs and second forklift devices to transfer a two-way pallet relative to an elongate roller path, each said forklift device having a pair of spaced apart forks for selectively lifting the pallet, the pallet having a top, a plurality of parallel spaced apart continuous scantlings connected to the top and a bottom connected to the scantlings, such that a plurality of fork-receiving spaces are defined between the top, the bottom and the respective scantlings, said elongate roller path having opposed initial and final regions for respectively feeding and removing the pallet from the elongate roller path, said arrangement being characterized by;

at least one of the initial and final regions of the roller path being provided with a pair of longitudinally extending recesses extending parallel to the elongate roller path, said recesses being dimensioned and disposed for receiving the forks of the second forklift device therein; and at least one interim parking station disposed in proximity to the fork receiving recesses of the roller path, the interim parking station having a parking surface dimensioned for supporting the pallet thereon, the parking surface having a pair of spaced apart elongate recesses disposed and dimensioned for receiving the forks of the second forklift device, the interim parking station being rotatable about an axis orthogonal to the parking surface thereof;

whereby the pallet can be deposited on and removed from the interim parking station by the first forklift device with the scantlings of the pallet aligned transverse to the recesses in the parking surface, and whereby the pallet can be transferred between the interim parking station and the roller path by selectively inserting the forks of the second forklift device below the bottom of the pallet and into the recesses of at least one of said interim parking stations and said roller path and subsequently lifting the forks and the pallet thereon.

6. An arrangement as in claim 5, wherein the second forklift device is positively guided for movement transverse to the elongate roller path for transferring the pallet between the interim parking station and the roller path.

* * * * *